United States Patent
Hammond et al.

(10) Patent No.: US 9,420,922 B2
(45) Date of Patent: Aug. 23, 2016

(54) WIPE CONTAINER ASSEMBLY

(71) Applicant: GOJO Industries, Inc., Akron, OH (US)

(72) Inventors: Ronald James Hammond, Bentleyville, OH (US); Eugene William Ray, Barberton, OH (US)

(73) Assignee: GOJO INDUSTRIES, INC., Akron, OH (US)

( * ) Notice: Subject to any disclaimer, the term of this patent is extended or adjusted under 35 U.S.C. 154(b) by 0 days.

(21) Appl. No.: 14/645,876

(22) Filed: Mar. 12, 2015

(65) Prior Publication Data

US 2015/0257613 A1  Sep. 17, 2015

Related U.S. Application Data

(60) Provisional application No. 61/951,581, filed on Mar. 12, 2014.

(51) Int. Cl.
*A47K 10/32* (2006.01)
*A47K 10/42* (2006.01)
*C02F 1/46* (2006.01)

(52) U.S. Cl.
CPC ............ *A47K 10/42* (2013.01); *A47K 10/32* (2013.01); *C02F 1/4606* (2013.01); *A47K 2010/3266* (2013.01); *A47K 2010/3273* (2013.01); *C02F 2201/4618* (2013.01)

(58) Field of Classification Search
CPC ...................................................... B32B 27/32
See application file for complete search history.

(56) References Cited

U.S. PATENT DOCUMENTS

| | | | | |
|---|---|---|---|---|
| 3,460,509 | A * | 8/1969 | Kaczeus | A47K 10/32 118/41 |
| 4,185,754 | A * | 1/1980 | Julius | A47K 10/421 206/210 |
| 5,843,540 | A * | 12/1998 | Heydarpour | B32B 27/32 383/10 |
| 6,231,747 | B1 | 5/2001 | Fukuzuka et al. | |
| 2007/0081803 | A1 | 4/2007 | Lindsay et al. | |
| 2013/0146449 | A1 | 6/2013 | Matsuyama et al. | |

FOREIGN PATENT DOCUMENTS

JP      10272076 A    10/1998

OTHER PUBLICATIONS

Int. Search Report/Written Opinion PCT Application No. PCT/US2015/020142 dated Jun. 18, 2015, 12 pgs.

* cited by examiner

*Primary Examiner* — Leslie A Nicholson, III
*Assistant Examiner* — Ayodeji Ojofeitimi
(74) *Attorney, Agent, or Firm* — Cooper Legal Group, LLC (57) ABSTRACT

A wipe container assembly includes a casing defining a chamber, a first electrode disposed within the chamber and a second electrode disposed within the chamber and spaced apart from the first electrode to define a spacing. The wipe container assembly includes a salt and water solution disposed within the chamber such that electrolyzed water is generated within the chamber from the salt and water solution when a bias is applied to one of the first electrode or second electrode to cause a current to flow through the salt and water solution within the spacing. The wipe container assembly includes an extraction port coupled to the casing and defining a wipe opening such that a wipe removed through the wipe opening is impregnated with the electrolyzed water. The wipe is impregnated with the electrolyzed water by coming into contact with the electrolyzed water within the chamber.

20 Claims, 10 Drawing Sheets

WIPE CONTAINER ASSEMBLY

CROSS-REFERENCE TO RELATED APPLICATIONS

This application claims priority to U.S. Provisional Patent Application No. 61/951,581, filed on Mar. 12, 2014, the entire disclosure of which is hereby incorporated by reference.

TECHNICAL FIELD

The instant application is generally directed towards a container assembly. For example, the instant application is directed towards a wipe container assembly for storing one or more wipes.

BACKGROUND

Wipe containers can store one or more wipes therein. The wipes can be used for washing and/or sanitizing purposes. Wipe containers can be used, for example, in schools, hospitals, nursing homes, factories, restaurants, etc., where washing and/or sanitizing may be desirable.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a wipe container assembly is provided. In an example, the wipe container assembly comprises a casing defining a chamber. The wipe container assembly comprises a first electrode disposed within the chamber. The wipe container assembly comprises a second electrode disposed within the chamber and spaced apart from the first electrode such that a spacing is defined between the first electrode and the second electrode. The wipe container assembly comprises a salt and water solution disposed within the chamber such that electrolyzed water is generated within the chamber from the salt and water solution when a bias is applied to at least one of the first electrode or the second electrode to cause a current to flow through the salt and water solution within the spacing. The wipe container assembly comprises an extraction port coupled to the casing and defining a wipe opening such that a wipe removed from the wipe container assembly through the wipe opening is impregnated with the electrolyzed water, where the wipe is impregnated with the electrolyzed water by coming into contact with the electrolyzed water within the chamber.

In another example, a wipe container assembly is provided. In an example, the wipe container assembly comprises a casing defining a chamber, a first electrode disposed within the chamber, and a second electrode disposed within the chamber and spaced apart from the first electrode such that a spacing is defined between the first electrode and the second electrode. The wipe container assembly comprises an insulating layer disposed between the first electrode and the second electrode, the insulating layer defining a current path opening. The wipe container assembly comprises a salt and water solution disposed within the chamber such that electrolyzed water is generated within the chamber from the salt and water solution when a bias is applied to at least one of the first electrode or the second electrode to cause a current to flow through the salt and water solution within the spacing and the current path opening.

In another example, a wipe container assembly is provided. In an example, the wipe container assembly comprises a housing defining a wipe receptacle configured to receive a wipe. The wipe container assembly comprises a casing defining a chamber. The wipe container assembly comprises a first electrode disposed within the chamber. The wipe container assembly comprises a second electrode disposed within the chamber and spaced apart from the first electrode such that a spacing is defined between the first electrode and the second electrode. The wipe container assembly comprises a salt and water solution disposed within the chamber such that electrolyzed water is generated within the chamber from the salt and water solution when a bias is applied to at least one of the first electrode or the second electrode to cause a current to flow through the salt and water solution within the spacing. The wipe container assembly comprises an extraction port coupled to the casing and defining a wipe opening through which the wipe is removed from the wipe container assembly. The wipe container assembly comprises a routing member connecting the housing to the casing, the routing member defining a pathway such that the wipe receptacle is exposed to the chamber through the pathway and the chamber is exposed to the wipe opening through the pathway such that the wipe extracted through the extraction port moves from the wipe receptacle through the chamber and out of the wipe container assembly through the wipe opening where the wipe is impregnated with the electrolyzed water as the wipe passes through the chamber.

The following description and annexed drawings set forth certain illustrative aspects and implementations. These are indicative of but a few of the various ways in which one or more aspects can be employed. Other aspects, advantages, and/or novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter.

Figure 1:
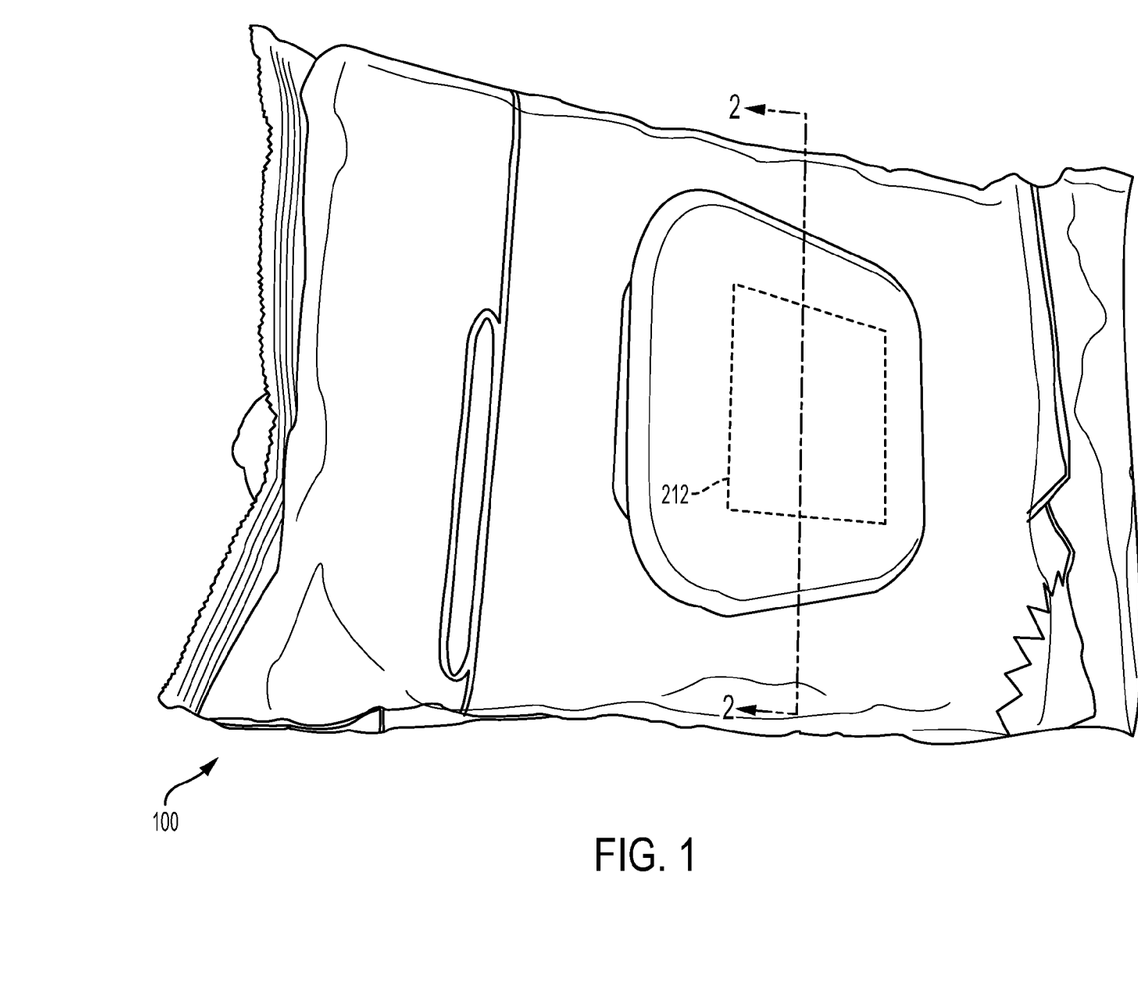
FIG. 1 is an illustration of an example wipe container assembly.

Turning to FIG. 1, a wipe container assembly 100 is illustrated. In general, the wipe container assembly 100 can be used for storing and/or dispensing wipes 102 (illustrated in FIG. 2) to a user. The wipe container assembly 100 can be used in association with any number of applications, such as personal hygiene, baby care, household cleaning (e.g., cleaning a surface), hand cleaning, sanitizing, etc. In some possible examples, the wipes 102 comprise a wet cloth, a wet wipe, wet napkin, etc.

The wipes 102 comprise any number of materials, including natural materials, woven or nonwoven materials, etc. The wipes 102 can be stored within the wipe container assembly 100 in any number of ways. For example, the wipes 102 can be provided in a folded, interfolded, unfolded, and/or rolled form, etc. Indeed, the wipes 102 can be stored within the wipe container assembly 100 in nearly any configuration that allows for the wipes 102 to be removable from the wipe container assembly 100.

The wipe container assembly 100 can include a salt and water solution. In an example, the salt and water solution may include tap water containing dissolved sodium chloride. Some or all of the wipes 102 may be impregnated (e.g., soaked, etc.) with the salt and water solution. As will be described below, a bias can be applied to the wipe container assembly 100 to cause a current to flow through the salt and water solution to generate electrolyzed water (e.g., sodium hypochlorite) from the salt and water solution. The electrolyzed water can be used as a cleaner/disinfectant/sanitizer.

Figure 2:
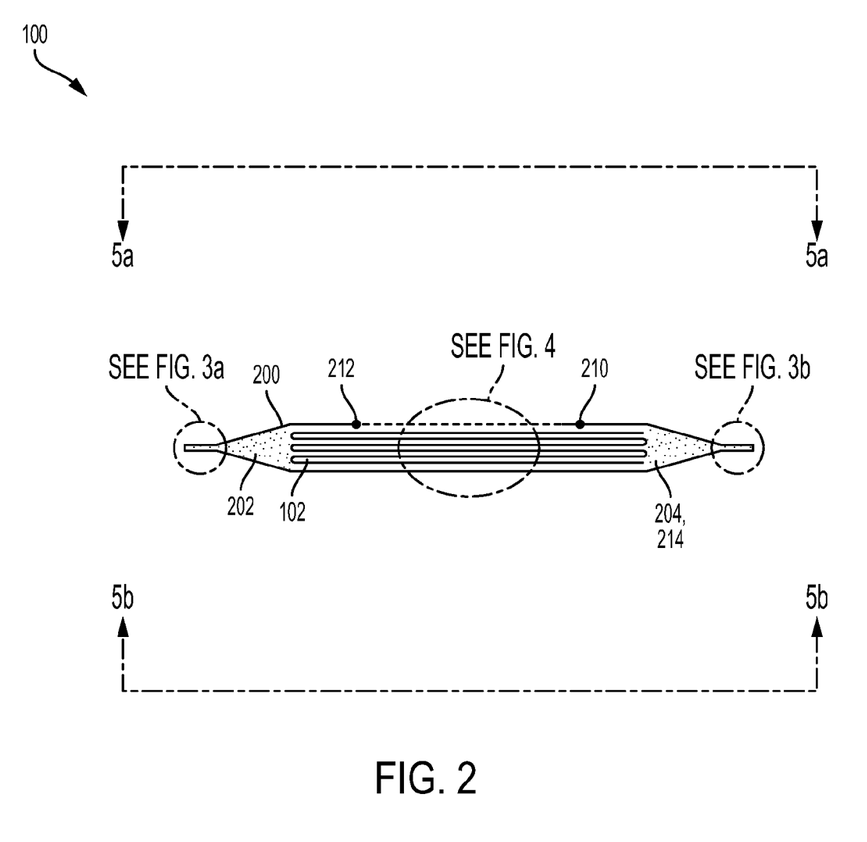
FIG. 2 is an illustration of a cross-section of an example wipe container assembly.

Turning to FIG. 2, a sectional view of the wipe container assembly 100 along lines 2-2 is illustrated. In this example, the wipe container assembly 100 comprises a casing 200. The casing 200 defines a substantially hollow enclosure, container, etc. In some examples, the casing 200 comprises a generally rigid, inflexible material, while in other examples, the casing 200 comprises a deformable, flexible material. The casing 200 defines a chamber 202 within which the wipes 102 are removably received. In some examples, a salt and water solution 204 can be received within the chamber 202.

It will be appreciated that while some examples herein illustrate the wipes 102 impregnated with the salt and water solution 204 within the chamber 202, the wipe container assembly 100 is not so limited. Indeed, in some examples, the chamber 202 may receive salt (e.g., without the water), such that the wipes 102 are initially surrounded by, impregnated with, coated with, etc. the salt (e.g., and not the water). In such an example, the wipes 102 may initially be dry, such that a user may moisten the wipes by adding water at a later time. As such, in this example, the chamber 202 is not limited to receiving the salt and water solution 204, and, instead, may separately receive the salt and/or the water (e.g., at different times).

The wipe container assembly 100 comprises an extraction port 210. The extraction port 210 is coupled to the casing 200 and defines a wipe opening 212 (illustrated with dashed lines in FIGS. 1 and 2). In an example, the wipes 102 can be removed from the wipe container assembly 100 through the wipe opening 212. The wipe removed from the wipe container assembly through the wipe opening may be impregnated with electrolyzed water 214.

Figure 3A:
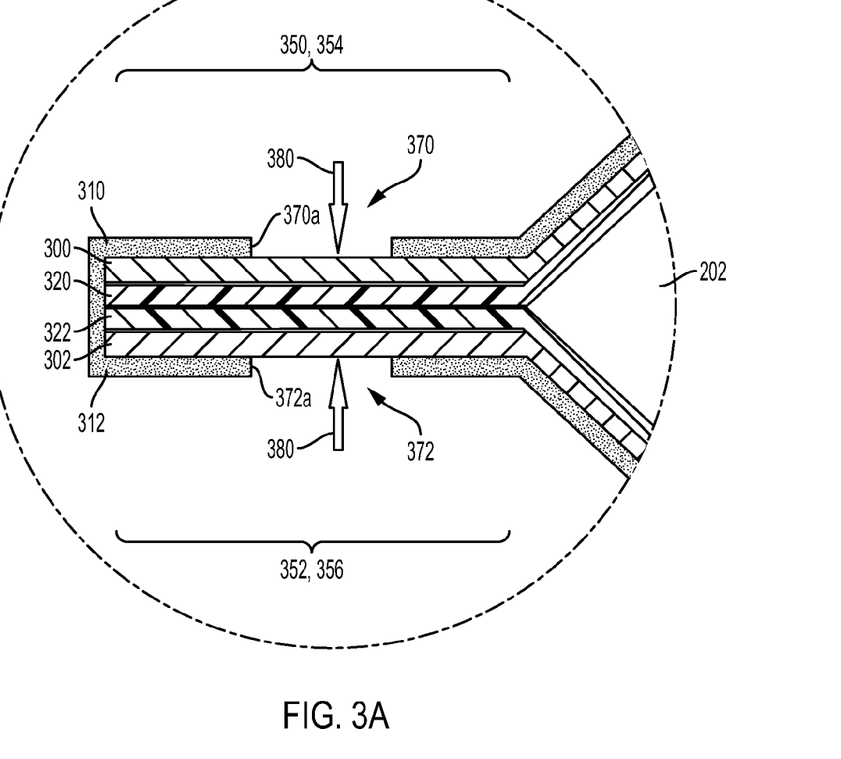
FIG. 3A is an illustration of an end view of an example wipe container assembly.
Figure 3B:
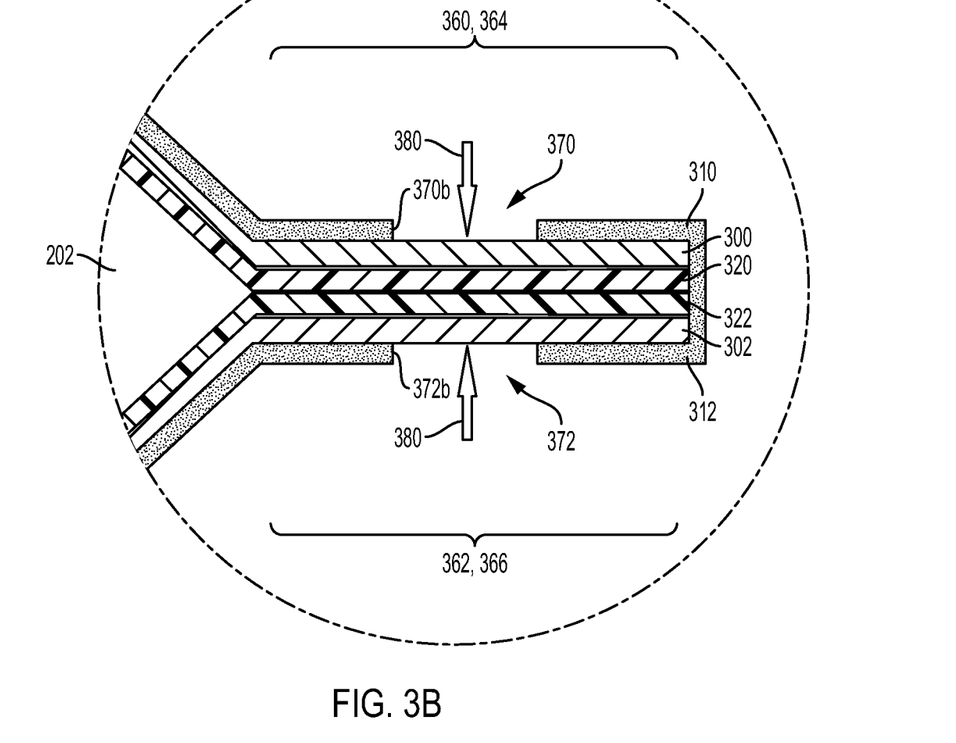
FIG. 3B is an illustration of an end view of an example wipe container assembly.

Turning to FIGS. 3A and 3B, the wipe container assembly 100 can include a first electrode 300 and a second electrode 302. The first electrode 300 is disposed within the chamber 202 (illustrated in FIG. 2). The second electrode 302 is disposed within the chamber 202 and spaced apart from the first electrode 300 such that a spacing 304 (illustrated in FIG. 4) is defined between the first electrode 300 and the second electrode 302. The first electrode 300 and second electrode 302 can have generally matching sizes/shapes but for being mirror images of each other.

The first electrode 300 and second electrode 302 include any number of electrically conductive materials, including metals or the like. In the illustrated example, the first electrode 300 and second electrode 302 comprise a sheet, film, laminated foil film, or similar elongated surface that is electrically conductive. In another example, the first electrode 300 and second electrode 302 may include a wire, cable, ribbon or the like.

The casing 200 of the wipe container assembly 100 comprises a first casing layer 310 and a second casing layer 312. The first casing layer 310 and second casing layer 312 are positioned adjacent and radially outward from the first electrode 300 and second electrode 302. For example, the first casing layer 310 extends adjacent and along an outer surface of the first electrode 300 such that the first casing layer 310 is disposed on an opposite side of the first electrode 300 from the chamber 202. The second casing layer 312 extends adjacent and along an outer surface of the second electrode 302 such that the second casing layer 312 is disposed on an opposite side of the second electrode 302 from the chamber 202. The first casing layer 310 and second casing layer 312 can have generally matching sizes/shapes but for being mirror images of each other.

The first casing layer 310 can be attached to the first electrode 300. The first casing layer 310 and first electrode 300 can be attached to each other in any number of ways, such as by adhesives, or the like. In some examples, the second casing layer 312 can be attached to the second electrode 302. The second casing layer 312 can be attached to the second electrode in any number of ways, such as by adhesives, or the like. The first casing layer 310 and second casing layer 312 comprise any number of materials, including plastics, or the like. In some examples, the first casing layer 310 and/or the second casing layer 312 can include graphics, text, pictures, etc. printed upon the first casing layer 310 and/or the second casing layer 312.

The wipe container assembly 100 can include an insulating layer 320 and a second insulating layer 322. In some examples, the insulating layer 320 and second insulating layer 322 can act as sealant layers, such that the insulating layer 320 and second insulating layer 322 may be attached/sealed. The insulating layer 320 is disposed between the first electrode 300 and the second electrode 302. In some examples, the second insulating layer 322 is disposed between the first electrode 300 and the second electrode 302. The insulating layer 320 is positioned adjacent and radially inward from the first electrode 300. For example, the insulating layer 320 extends adjacent and along an inner surface of the first electrode 300 such that the insulating layer 320 is disposed on an opposite side of the first electrode 300 from the first casing layer 310. The second insulating layer 322 is positioned adjacent and along an inner surface of the second electrode 302 such that the second insulating layer 322 is disposed on an opposite side of the second electrode 302 from the second casing layer 312.

The insulating layer 320 and second insulating layer 322 comprise any numbers of materials. In some examples, the insulating layer 320 and second insulating layer 322 include an electrical insulator with a relatively high resistivity. The insulating layer 320 and second insulating layer 322 can be attached to the first electrode 300 and the second electrode 302, respectively. The insulating layer 320 and second insulating layer 322 can have generally matching sizes/shapes but for being mirror images of each other.

The first casing layer 310 can be attached to the second casing layer 312 by a first portion 350 of the insulating layer 320. In an example, the first portion 350 of the insulating layer 320 is attached to a first portion 352 of the second insulating layer 322 (e.g., by adhesives, sealants, or the like). As such, a first portion 354 of the first casing layer 310 is attached to a first portion 356 of the second casing layer 312 by the first portion 350 of the insulating layer 320 and the first portion 352 of the second insulating layer 322.

FIG. 3B illustrates an opposite end of the wipe container assembly 100 from FIG. 3A. As illustrated, a second portion 360 of the insulating layer 320 is attached to a second portion 362 of the second insulating layer 322 (e.g., by adhesives, sealants, or the like). As such, a second portion 364 of the first casing layer 310 is attached to a second portion 366 of the second casing layer by the second portion 360 of the insulating layer 320 and the second portion 362 of the second insulating layer 322.

Referring to FIGS. 3A and 3B, the casing 200 defines at least one of a cathode opening 370 or an anode opening 372. In an example, the first portion 354 of the first casing layer 310 of the casing 200 comprises a first cathode opening 370a while the second portion 364 of the first casing layer 310 of the casing 200 comprises a second cathode opening 370b. The cathode opening 370a, 370b defines a space, gap, hole, etc. through the first casing layer 310 to the first electrode 300. As such, a bias 380 can be applied through the cathode opening 370a, 370b to the first electrode 300. The bias 380 can be applied in any number of ways, such as with an electrical device or the like.

In some examples, the first portion 356 of the second casing layer 312 of the casing 200 comprises a first anode opening 372a while the second portion 366 of the second casing layer 312 comprises a second anode opening 372b. The anode opening 372a, 372b defines a space, gap, hole, etc. through the second casing layer 312 to the second electrode 302. As such, the bias 380 can be applied through the anode opening 372a, 372b to the second electrode 302.

Figure 4:
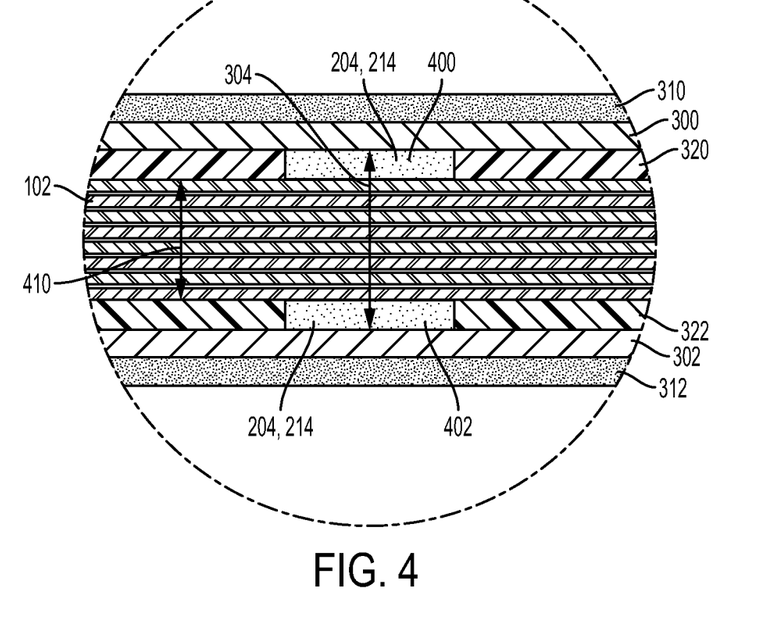
FIG. 4 is an illustration of a sectional view of an example wipe container assembly.

Turning to FIG. 4, a central portion of the wipe container assembly 100 is illustrated. The insulating layer 320 and second insulating layer 322 can define one or more openings. In the illustrated example, the insulating layer 320 defines a current path opening 400. While FIG. 4 illustrates one current path opening 400, any number (e.g., one or more) current path openings 400 may be provided. In the illustrated example, the second insulating layer 322 defines a second current path opening 402. While FIG. 4 illustrates one second current path opening 402, any number (e.g., one or more) second current path openings 402 may be provided.

When the bias 380 is applied through the cathode opening 370a, 370b and/or the anode opening 372a, 372b (e.g., illustrated in FIGS. 3A and 3B), current can flow through the first electrode 300 and/or the second electrode 302. In some examples, the spacing 304 is defined between the first electrode 300 and second electrode 302 through the current path opening 400 and second current path opening 402. In such an example, current can flow through the salt and water solution 204 within the spacing 304, the current path opening 400 and the second current path opening 402.

The chamber 202 comprises a distribution area 410. In an example, the distribution area 410 is not disposed between the current path opening 400 and the second current path opening 402. Rather, the distribution area 410 may be disposed between the insulating layer 320 and second insulating layer 322.

In some examples, the salt and water solution 204 is disposed within the chamber 202. Electrolyzed water 214 can be generated within the chamber 202 from the salt and water solution 204 when the bias 380 is applied to at least one of the first electrode 300 or second electrode 302. As such, a current can flow through the salt and water solution 204 within the spacing 304, which generates the electrolyzed water 214.

Figure 5A:
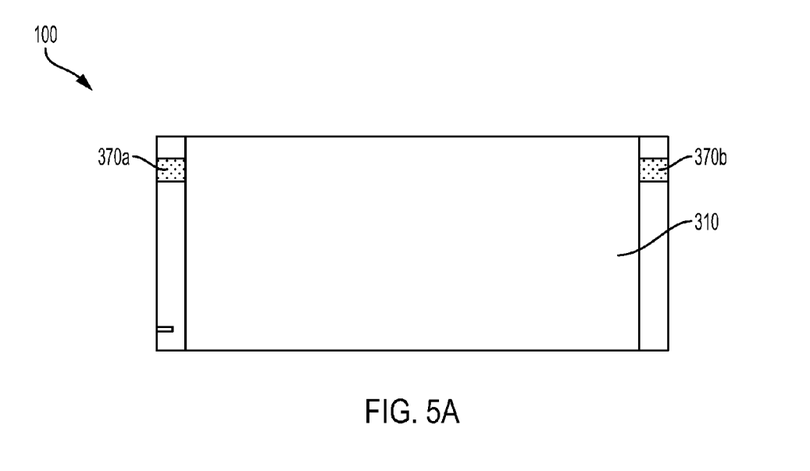
FIG. 5A is an illustration of a top view of an example wipe container assembly.

Turning to FIG. 5A, a top down view of the wipe container assembly 100 as viewed from a perspective depicted by line 5A-5A in FIG. 2 is illustrated. As illustrated, the wipe container assembly 100 comprises the first casing layer 310 along a top of the wipe container assembly 100. The first casing layer 310 includes the cathode opening 370. For example, the first casing layer 310 includes the first cathode opening 370a and the second cathode opening 370b that extend through the first casing layer 310. The first cathode opening 370a and second cathode opening 370b define the opening, passage, space, etc. to the first electrode 300. As such, the bias 380 can be applied to the first electrode 300 through the first cathode opening 370a and/or the second cathode opening 370b.

Figure 5B:
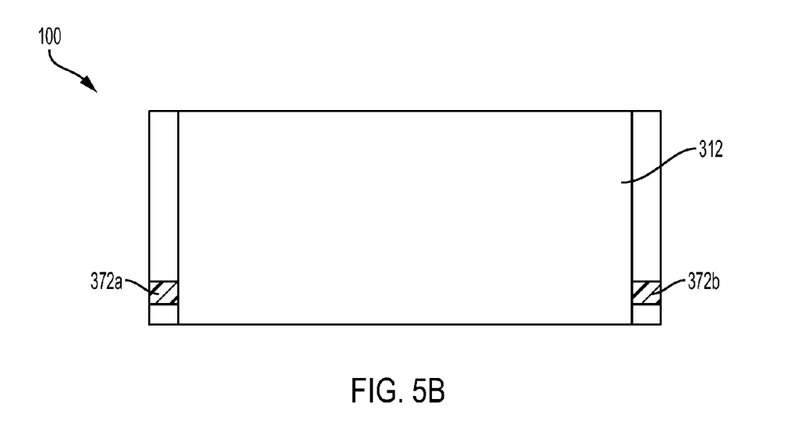
FIG. 5B is an illustration of a bottom view of an example wipe container assembly.

Turning to FIG. 5B, a bottom up view of the wipe container assembly 100 as viewed from a perspective depicted by line 5B-8A in FIG. 2 is illustrated. As illustrated, the wipe container assembly 100 comprises the second casing layer 312 along a bottom of the wipe container assembly 100. The second casing layer 312 includes the anode opening 372. For example, the second casing layer 312 includes the first anode opening 372a and the second anode opening 372b that extend through the second casing layer 312. The first anode opening 372a and second anode opening 372b define the opening, passage, space, etc. to the second electrode 302. As such, the bias 380 can be applied to the second electrode 302 through the first anode opening 372a and/or the second anode opening 372b.

Figure 6:
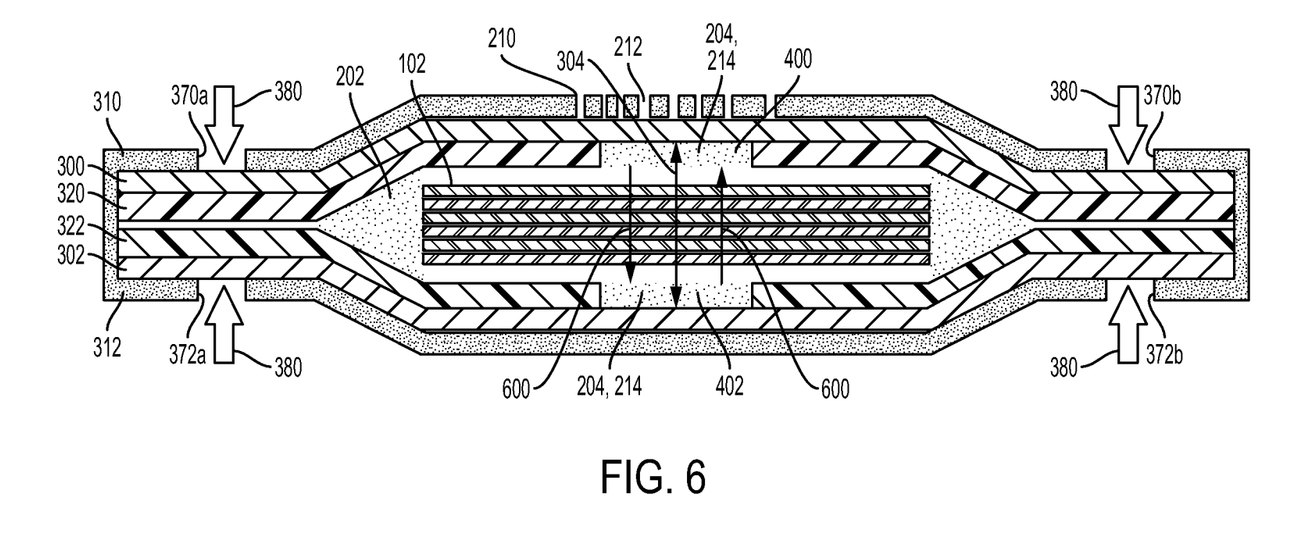
FIG. 6 is an illustration of an example wipe container assembly.

Turning to FIG. 6, an example operation of the wipe container assembly 100 is illustrated. In this example, the bias 380 can be applied through the cathode opening(s) 370a and/or 370b to the first electrode 300 and/or through the anode opening(s) 372a and/or 372b to the second electrode 302. Other than through the salt and water solution 204 within the spacing 304, the first electrode 300 and the second electrode 302 are generally electrically isolated from other conductive materials (e.g., are short circuits). When the bias 380 is applied, current can thus flow from the first electrode 300 through the current path opening 400, the salt and water solution 204 within the spacing 304, the second current path opening 402 and into the second electrode 302 (or in the opposite direction), which generates the electrolyzed water 214. It will be appreciated that while the wipe container assembly 100 includes the current path opening 400 and the second current path opening 402, any number of current path openings (e.g., one or more) are contemplated as being defined within or by the insulating layer 320 and/or the second insulating layer 322.

Figure 7:
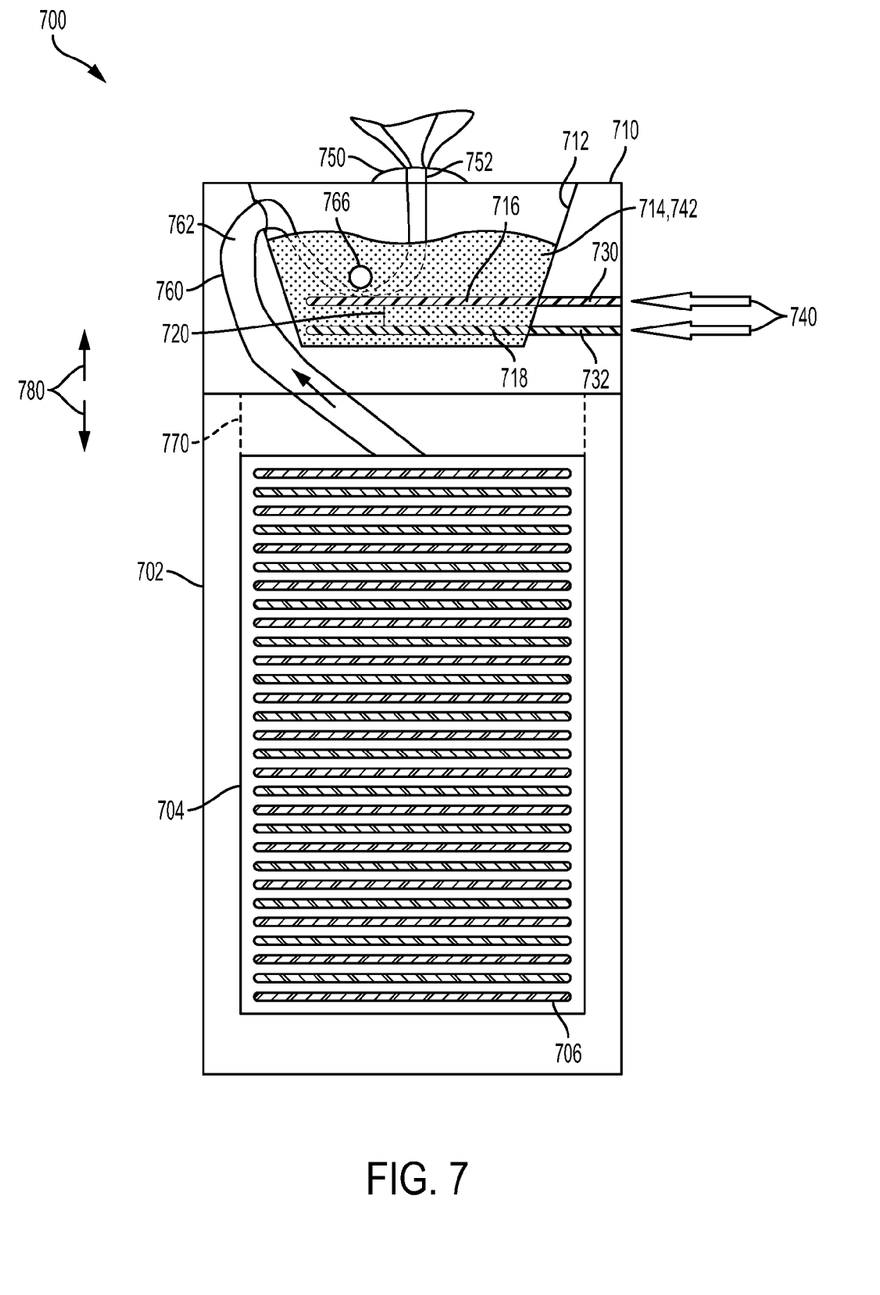
FIG. 7 is an illustration of a second example wipe container assembly.

Turning to FIG. 7, a second example wipe container assembly 700 is illustrated. In this example, the second wipe container assembly 700 can include a housing 702. The housing 702 defines a wipe receptacle 704 that can receive a wipe 706. In the illustrated example, the housing 702 is an elongated, generally vertically extending container, vessel, etc. The wipe receptacle 704 is generally hollow, such that the wipe receptacle 704 can receive the wipes 706 in a stacked arrangement. In this example, the wipes 706 are arranged in a vertically stacked arrangement, though any number of arrangements are envisioned. In an example, the wipes 706 received in the wipe receptacle 704 may not be impregnated with the electrolyzed water.

The second wipe container assembly 700 can include a casing 710. The casing 710 may be attached (e.g., removably attached, etc.) to the housing 702. In an example, the casing 710 may be attached to an end of the housing 702. The casing 710 defines a chamber 712. The chamber 712 is generally hollow, such that a salt and water solution 714 may be disposed within the chamber 712. The chamber 712 comprises any number of sizes/shapes, and in some examples, may be larger or smaller than as illustrated. The salt and water solution 714 disposed within the chamber may be generally identical to the salt and water solution 204 described with respect to FIG. 2.

The second wipe container assembly 700 can include a first electrode 716 and a second electrode 718. The first electrode 716 is disposed within the chamber 712. The second electrode 718 is disposed within the chamber 712 and spaced apart from the first electrode 716 such that a spacing 720 is defined between the first electrode 716 and the second electrode 718. The first electrode 716 and second electrode 718 may have generally matching sizes/shapes as illustrated, though, in other examples, the first electrode 716 and second electrode 718 may have different sizes/shapes. Likewise, the first electrode 716 and second electrode 718 may be positioned closer together or farther apart, such that the spacing 720 between the first electrode 716 and second electrode 718 may be larger or smaller than as illustrated.

The first electrode 716 and second electrode 718 include any number of electrically conductive materials, including metals or the like. In the illustrated example, the first electrode 716 and second electrode 718 may include a wire, cable, conductor, etc. The first electrode 716 and second electrode 718 may extend from the chamber 712 and through the casing 710. In such an example, the casing 710 defines at least one of a cathode opening 730 or an anode opening 732 through which a bias 740 may be applied. In the illustrated example, the bias 740 can be applied to the first electrode 716 through the cathode opening 730 and/or to the second electrode 718 through the anode opening 732. In some examples, an insulating material may cover at least some of the first electrode 716 and/or the second electrode 718.

Electrolyzed water 742 can be generated within the chamber 712 from the salt and water solution 714 when the bias 740 is applied to at least one of the first electrode 716 or the second electrode 718 to cause a current to flow through the salt and water solution 714 within the spacing 720. This electrolyzed water 742 can be used as a cleaner/disinfectant/sanitizer. In the illustrated example, other than the salt and water solution 714 within the spacing 720, the first electrode 716 and the second electrode 718 are generally electrically isolated from other conductive materials (e.g., are short circuits).

The second wipe container assembly 700 can include an extraction port 750. The extraction port 750 is coupled to the casing 710 and defines a wipe opening 752 through which the wipe 706 is removed from the second wipe container assembly 700. The wipe opening defines a passageway, opening, channel, etc. through which the wipe 706 can pass from the chamber 712. In the illustrated example, the extraction port 750 is disposed on an opposite side of the casing 710 from the housing 702. In other examples, the extraction port 750 and wipe opening 752 could be positioned at nearly any location within the casing 710, including along a sidewall of the casing 710, etc.

The second wipe container assembly 700 can include a routing member 760 connecting the housing 702 to the casing 710. The routing member 760 defines a pathway 762 such that the wipe receptacle 704 is exposed to the chamber 712 through the pathway 762 and the chamber 712 is exposed to the wipe opening 752 through the pathway 762. In an example, the pathway 762 is substantially hollow, such that the wipe 706 can move from the wipe receptacle 704 and through the pathway 762 of the routing member 760. The wipe 706 can move along the pathway 762 through the chamber 712 to the wipe opening 752.

In some examples, the wipe 706 extracted through the extraction port 750 can move from the wipe receptacle 704 through the chamber 712 and out of the second wipe container assembly 700 through the wipe opening 752 where the wipe 706 is impregnated with the electrolyzed water 742 as the wipe 706 passes through the chamber 712. In the illustrated example, the wipe 706 is impregnated with the electrolyzed water 742 by coming into contact with the electrolyzed water 742 within the chamber 712. As such, the wipe 706 may be disposed within the chamber 712 (e.g., within the electrolyzed water 742) prior to being removed from the second wipe container assembly 700. In some examples, the routing member 760 may include a fluid restriction device (e.g., a valve, etc.) to limit/control the electrolyzed water 742 from flowing from the chamber 712 and to the wipe receptacle 704 through the pathway 762.

In the illustrated example, the second wipe container assembly 700 may include a guide structure 766 positioned within the chamber 712. For example, the guide structure 766 can extend within the electrolyzed water 742 and across the chamber 712. The guide structure 766 can guide, direct, route, etc. the wipe 706 through the electrolyzed water 742 as the wipe 706 is moved through the chamber 712 to the wipe opening 752. In this example, the wipe 706 is guided/routed underneath the guide structure 766 from the routing member 760 to the wipe opening 752.

The second wipe container assembly 700 can include loading opening 770. In this example, the housing 702 defines the loading opening 770 for loading the wipe 706 into the wipe receptacle 704. The housing 702 may be detachable 780 (illustrated generically/schematically with arrows) from the casing 710 to reveal the loading opening 770. The housing 702 and casing 710 may be detachable 780 in any number of ways, such as by mechanical fasteners, screwing/threading, etc.

Figures 8A, 8B:
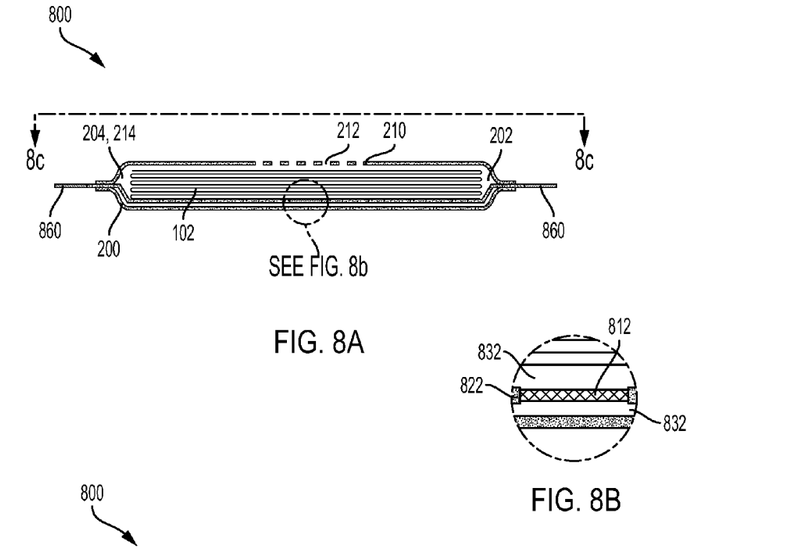
FIG. 8A is an illustration of a third example wipe container assembly.
FIG. 8B is an illustration of a third example wipe container assembly.
Figure 8C:
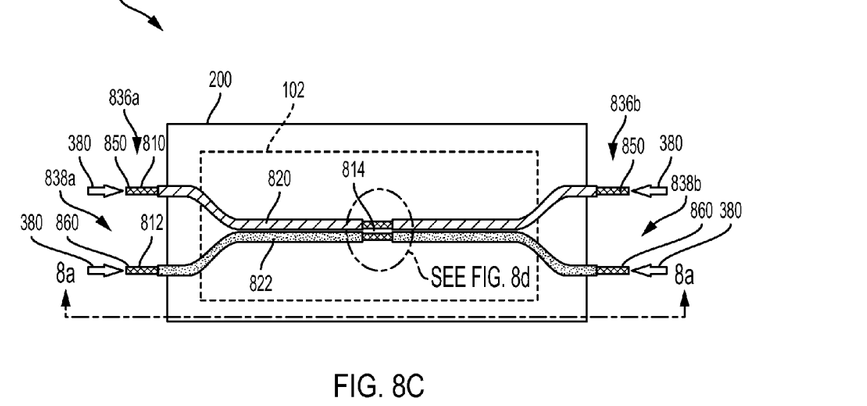
FIG. 8C is an illustration of a third example wipe container assembly.

Turning to FIGS. 8A to 8D, a third example wipe container assembly 800 is illustrated, where FIG. 8C is a top down view as viewed from a perspective depicted by line 8C-8C in FIG. 8A and FIG. 8A is a side view as viewed from a perspective depicted by lines 8A-8A in FIG. 8C. In the illustrated example, the third wipe container assembly 800 may include the casing 200 defining the chamber 202. The casing 200 can receive the wipes 102 and the salt and water solution 204 and/or may receive salt and water separately (e.g., at different times but eventually forming the salt and water solution 204). As with the wipe container assembly 100, the third wipe container assembly 800 can include the extraction port 210 coupled to the casing 200 and defining the wipe opening 212.

In this example, the third wipe container assembly 800 can include a first electrode 810 and a second electrode 812 (both illustrated in FIG. 8C). The first electrode 810 and second electrode 812 are disposed within the chamber 202 of the casing 200, with portions of the first electrode 810 and the second electrode 812 extending outwardly from the casing 200. The first electrode 810 and the second electrode 812 may be heat and/or otherwise sealed with respect to the chamber 202, such that the salt and water solution 204 is inhibited from leaking out of the casing 200. The first electrode 810 and the second electrode 812 may be spaced apart from one another such that a spacing 814 (illustrated in FIGS. 8C and 8D) is defined between the first electrode 810 and the second electrode 812 within the chamber 202. The first electrode 810 and the second electrode 812 can, but need not, have matching sizes/shapes. In the illustrated example, the first electrode 810 and second electrode 812 are positioned near a bottom of the chamber 202, underneath the wipes 102. However, such as position is not intended to be limiting, as the first electrode 810 and second electrode 812 could be positioned at nearly any position within the chamber 202, such as near a top of the chamber 202, across the middle of the chamber 202 between the wipes 102, etc.

Figure 8D:
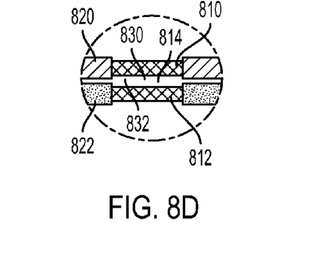
FIG. 8D is an illustration of a third example wipe container assembly.

The first electrode 810 and second electrode 812 include any number of electrically conducting materials, including metals or the like. In the illustrated example, the first electrode 810 and second electrode 812 comprise a wire, such as an insulated wire. As illustrated in FIGS. 8C and 8D, the first electrode 810 and second electrode 812 may be surrounded by an electrically insulating layer 820, 822. For example, the first electrode 810 may be surrounded by a first insulating layer 820. The second electrode 812 may be surrounded by a second insulating layer 822. It will be appreciated that the first insulating layer 820 and second insulating layer 822 illustrated herein may be generally identical in structure, material, etc.

As illustrated in FIGS. 8B to 8D, portions of the first insulating layer 820 and the second insulating layer 822 can be removed to define one or more current path openings (e.g., first current path opening 830 and second current path opening 832). In the illustrated example, the first insulating layer 820 defines the first current path opening 830 while the second insulating layer 822 defines the second current path opening 832. While the first insulating layer 820 defines one first current path opening 830, any number (e.g., one or more) of first current path openings 830 can be provided. Similarly, while the second insulating layer 822 defines one second current path opening 832, any number (e.g., one or more) of second current path openings 832 can be provided.

As illustrated in FIG. 8C, a first end 836a of the first electrode 810 and a second end 836b of the first electrode 810 may extend outwardly from the casing 200. In the illustrated example, a first end 838a of the second electrode 812 and a second end 838b of the second electrode 812 may extend outwardly from the casing 200. In this example, portion(s) of the first insulating layer 820 near the first end 836a and/or the second end 836b of the first electrode 810 may be removed to define a cathode opening(s) 850. In an example, portions(s) of the second insulating layer 822 near the first end 838a and/or the second end 838b of the second electrode 812 may be removed to define an anode opening(s) 860.

A bias (e.g., bias 380 illustrated in FIG. 8C) can be applied to the first electrode 810 through one or more of the cathode opening(s) 850 and/or a bias (e.g., bias 380) can be applied to the second electrode 812 through one or more of the anode opening(s) 860.

Figure 9:
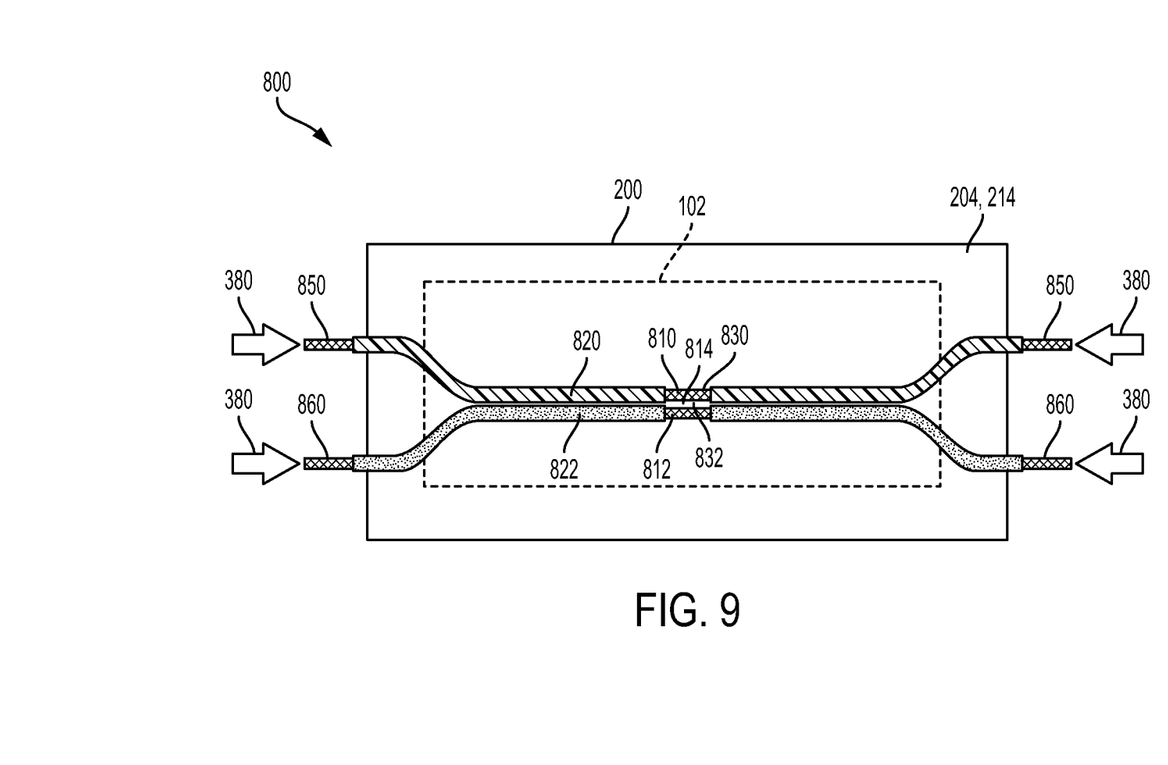
FIG. 9 is an illustration of a third example wipe container assembly.

Turning to FIG. 9, an example operation of the third wipe container assembly 800 is illustrated. In this example, the bias 380 can be applied through one or more of the cathode opening(s) 850 to the first electrode 810 and/or through one or more of the anode opening(s) 860 to the second electrode 812. Other than through the salt and water solution 204 within the spacing 814, the first electrode 810 and the second electrode 812 are generally electrically isolated from other conductive materials (e.g., are short circuits). When the bias 380 is applied, current can thus flow from the first electrode 810 through the first current path opening 830, the salt and water solution 204 within the spacing 814, the second current path opening 832 and into the second electrode 812 (or in the opposite direction), which generates the electrolyzed water 214. It will be appreciated that any number of current path openings (e.g., one or more) are contemplated.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first end and a second end generally correspond to end A and end B or two different or two identical ends or the same end.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A wipe container assembly comprising:
a casing defining a chamber;
a first electrode disposed within the chamber;
a second electrode disposed within the chamber and spaced apart from the first electrode such that a spacing is defined between the first electrode and the second electrode;
a salt and water solution disposed within the chamber such that electrolyzed water is generated within the chamber from the salt and water solution when a bias is applied to at least one of the first electrode or the second electrode to cause a current to flow through the salt and water solution within the spacing;
an extraction port coupled to the casing and defining a wipe opening such that a wipe removed from the wipe container assembly through the wipe opening is impregnated with the electrolyzed water, where the wipe is impregnated with the electrolyzed water by coming into contact with the electrolyzed water within the chamber;
an insulating layer disposed between the first electrode and the second electrode, the insulating layer defining a current path opening; and
a second insulating layer disposed between the insulating layer and the second electrode, the second insulating layer defining a second current path opening such that the current flows through the salt and water solution within the spacing, the current path opening, and the second current path opening.

2. The wipe container assembly of claim 1, wherein the wipe is disposed within the chamber prior to being removed from the wipe container assembly.

3. The wipe container assembly of claim 1, wherein the casing defines at least one of a cathode opening or an anode opening through which the bias is applied.

4. The wipe container assembly of claim 1, wherein the casing comprises a first casing layer and a second casing layer, the first casing layer attached to the second casing layer by a first portion of the insulating layer.

5. The wipe container assembly of claim 4, where the first portion of the insulating layer is attached to a first portion of the second insulating layer such that a first portion of the first casing layer is attached to a first portion of the second casing layer by the first portion of the insulating layer and the first portion of the second insulating layer.

6. The wipe container assembly of claim 5, wherein a second portion of the insulating layer is attached to a second portion of the second insulating layer such that a second portion of the first casing layer is attached to a second portion of the second casing layer by the second portion of the insulating layer and the second portion of the second insulating layer.

7. The wipe container assembly of claim 1, wherein the chamber comprises a distribution area that is not disposed between the current path opening and the second current path opening.

8. The wipe container assembly of claim 7, wherein the distribution area is disposed between the insulating layer and the second insulating layer.

9. The wipe container assembly of claim 1, wherein the casing defines at least one of a cathode opening or an anode opening through which the bias is applied.

10. The wipe container assembly of claim 1, wherein a central portion of the insulating layer is spaced apart from and not in contact with a second central portion of the second insulating layer.

11. The wipe container assembly of claim 1, wherein the wipe is positioned within the spacing defined between the first electrode and the second electrode.

12. A wipe container assembly comprising:
a casing defining a chamber, wherein the casing comprises a first casing layer and a second casing layer;
a first electrode disposed within the chamber;
a second electrode disposed within the chamber and spaced apart from the first electrode such that a spacing is defined between the first electrode and the second electrode;
an insulating layer disposed between the first electrode and the second electrode, the insulating layer defining a current path opening, the first casing layer attached to the second casing layer by a first portion of the insulating layer;
a salt and water solution disposed within the chamber such that electrolyzed water is generated within the chamber from the salt and water solution when a bias is applied to at least one of the first electrode or the second electrode to cause a current to flow through the salt and water solution within the spacing and the current path opening; and
a second insulating layer, where the first portion of the insulating layer is attached to a first portion of the second insulating layer such that a first portion of the first casing layer is attached to a first portion of the second casing layer by the first portion of the insulating layer and the first portion of the second insulating layer, a second portion of the insulating layer is attached to a second portion of the second insulating layer such that a second portion of the first casing layer is attached to a second portion of the second casing layer by the second portion of the insulating layer and the second portion of the second insulating layer;
wherein the second insulating layer defines a second current path opening such that the current flows through the salt and water solution within the spacing, the current path opening and the second current path opening.

13. The wipe container assembly of claim 12, an extraction port coupled to the casing and defining a wipe opening such that a wipe removed from the wipe container assembly through the wipe opening is impregnated with the electrolyzed water, where the wipe is impregnated with the electrolyzed water by coming into contact with the electrolyzed water within the chamber.

14. The wipe container assembly of claim 12, wherein the chamber comprises a distribution area that is not disposed between the current path opening and the second current path opening.

15. The wipe container assembly of claim 12, wherein the casing defines at least one of a cathode opening or an anode opening through which the bias is applied.

16. A wipe container assembly comprising:
a housing defining a wipe receptacle configured to receive a wipe;
a casing defining a chamber;
a first electrode disposed within the chamber;

a second electrode disposed within the chamber and spaced apart from the first electrode such that a spacing is defined between the first electrode and the second electrode;

a salt and water solution disposed within the chamber such that electrolyzed water is generated within the chamber from the salt and water solution when a bias is applied to at least one of the first electrode or the second electrode to cause a current to flow through the salt and water solution within the spacing;

an extraction port coupled to the casing and defining a wipe opening through which the wipe is removed from the wipe container assembly;

a guide structure positioned within the salt and water solution of the chamber, the guide structure positioned above at least one of the first electrode or the second electrode such that the at least one of the first electrode or the second electrode is positioned between the guide structure and the housing; and a routing member connecting the housing to the casing, the routing member defining a pathway such that the wipe receptacle is exposed to the chamber through the pathway and the chamber is exposed to the wipe opening through the pathway such that the wipe extracted through the extraction port moves from the wipe receptacle through the chamber, under the guide structure, and out of the wipe container assembly through the wipe opening where the wipe is impregnated with the electrolyzed water as the wipe passes through the chamber.

17. The wipe container assembly of claim 16, the housing defining a loading opening for loading the wipe into the wipe receptacle.

18. The wipe container assembly of claim 17, the housing detachable from the casing to reveal the loading opening.

19. The wipe container assembly of claim 16, wherein the casing defines at least one of a cathode opening or an anode opening through which the bias is applied.

20. The wipe container assembly of claim 16, wherein the wipe received in the wipe receptacle is not impregnated with the electrolyzed water.

* * * * *